United States Patent
Deguy (10) Patent No.: US 10,229,514 B2
(45) Date of Patent: Mar. 12, 2019

(54) SYSTEM AND METHOD FOR COLORIMETRIC AND GEOMETRIC PARAMETRIZATION OF PROCEDURAL TEXTURES ON AN OBJECT

(71) Applicant: ALLEGORITHMIC, Clermont-Ferrand (FR)

(72) Inventor: Sebastien Deguy, Clermont-Ferrand (FR)

(73) Assignee: ALLEGORITHMIC, Clermont-Ferrand (FR)

( * ) Notice: Subject to any disclaimer, the term of this patent is extended or adjusted under 35 U.S.C. 154(b) by 0 days.

(21) Appl. No.: 15/503,084

(22) PCT Filed: Jul. 20, 2015

(86) PCT No.: PCT/IB2015/001210
§ 371 (c)(1),
(2) Date: May 1, 2017

(87) PCT Pub. No.: WO2016/024153
PCT Pub. Date: Feb. 18, 2016

(65) Prior Publication Data
US 2017/0249756 A1  Aug. 31, 2017

(30) Foreign Application Priority Data
Aug. 14, 2014 (FR) ..................................... 14 01849

(51) Int. Cl.
*G06T 11/00* (2006.01)
*G06T 15/04* (2011.01)

(52) U.S. Cl.
CPC ............ *G06T 11/001* (2013.01); *G06T 15/04* (2013.01); *G06T 2215/16* (2013.01)

(58) Field of Classification Search
None
See application file for complete search history.

(56) References Cited

U.S. PATENT DOCUMENTS 5,432,896 A * 7/1995 Hwong ................. G06T 11/001
                                                    345/592
5,687,304 A * 11/1997 Kiss ....................... G06T 15/04
                                                    345/419

(Continued)

FOREIGN PATENT DOCUMENTS

EP       0884694 A1    12/1998
FR       2681967 A1    4/1993

(Continued)

OTHER PUBLICATIONS

Chu, NS-H., and Chiew-Lan Tai. "An efficient brush model for physically-based 3D painting." Computer Graphics and Applications, 2002. Proceedings. 10th Pacific Conference on. IEEE, 2002. (Year: 2002).*

(Continued)

*Primary Examiner* — Ryan M Gray
(74) *Attorney, Agent, or Firm* — Karceski IP Law, PLLC (57) ABSTRACT

The invention relates to a system and method for generating procedural textures on an object on the basis of physical ink data and physical applicator data. The system includes: access to target object data having data for initial meshing and initial contouring of the target objects; access to data pertaining to mixture rules and mixture functions; access to physical data for initial textures T; a module for generating a pre-projection virtual rendering provided to combine the physical ink data with the physical applicator data; a module for tessellating the data of the target objects so as to convert the contours of the target objects into meshing; and an integrating module for the physical parameters, the integrating module being provided to generate a new set of textures T+I for the object(s).

19 Claims, 2 Drawing Sheets

(56) References Cited

U.S. PATENT DOCUMENTS

| | | | |
|---|---|---|---|
| 6,198,489 B1* | 3/2001 | Salesin | G06T 11/001 715/784 |
| 8,296,668 B1* | 10/2012 | Song | G06F 3/0481 345/581 |
| 8,335,675 B1* | 12/2012 | DiVerdi | G06T 13/80 434/81 |
| 8,988,461 B1* | 3/2015 | Schmid | G06T 11/001 345/426 |
| 2010/0045669 A1 | 2/2010 | Johnson | |
| 2010/0156920 A1 | 6/2010 | Shin et al. | |
| 2011/0251829 A1* | 10/2011 | Baxter, III | G06T 11/001 703/1 |
| 2013/0127898 A1* | 5/2013 | DiVerdi | G06T 11/203 345/600 |
| 2014/0081610 A1* | 3/2014 | DiVerdi | G06T 11/203 703/6 |
| 2014/0132619 A1* | 5/2014 | Landsberger | G06T 11/001 345/589 |
| 2016/0247311 A1* | 8/2016 | Deguy | G06T 15/04 |

FOREIGN PATENT DOCUMENTS

| | | |
|---|---|---|
| WO | 2008066880 A2 | 6/2008 |
| WO | 2012014057 A2 | 2/2012 |
| WO | 2012154258 A1 | 11/2012 |

OTHER PUBLICATIONS

Baxter, William, Jeremy Wendt, and Ming C. Lin. "IMPaSTo: a realistic, interactive model for paint." Proceedings of the 3rd international symposium on Non-photorealistic animation and rendering. ACM, 2004. (Year: 2004).*

Van Laerhoven, Tom, and Frank Van Reeth. "Real-time simulation of watery paint." Computer Animation and Virtual Worlds 16.3-4 (2005): 429-439. (Year: 2005).*

Dorsey, Julie, et al., "Flow and Changes in Appearance," Computer Graphics Proceedings 1996 (Siggraph), Aug. 4-9, 1996, New York, New York, ACM, pp. 411-420.

* cited by examiner

SYSTEM AND METHOD FOR COLORIMETRIC AND GEOMETRIC PARAMETRIZATION OF PROCEDURAL TEXTURES ON AN OBJECT

CROSS-REFERENCE TO RELATED APPLICATION(S)

This is a National Stage Entry into the U.S. Patent and Trademark Office from International PCT Patent Application No. PCT/IB2015/001210, having an international filing date of Jul. 20, 2015, which claims priority to French Patent Application No. FR 14/01849, filed Aug. 14, 2014, the entire contents of both of which are incorporated herein by reference.

FIELD OF THE INVENTION

The present invention relates to a system and method for generating textures on an object from data other than colorimetric data.

RELATED ART

In the field of computer graphics, a wide variety of tools have been in use for many years for applying colors onto objects. Conventionally, a color is applied as a layer, in the manner of a layer of paint applied to a real physical substrate.

Applying a color layer conventionally produces a uniform result. To perform variations in color, strength or opacity, a user must proceed manually to set color parameters at each point, thereby generating an accurate and detailed colorimetric mapping. Different graphics tools such as virtual brushes or applicators are available to a user who performs such a "mapping".

To change a previously established "mapping", a user will use the same types of tool for applying the changed parameters point after point, thereby producing a modified colorimetric result. Even though a user may use an enclosing box to select several points to be changed in a similar way, the process must be carried out manually, for each image, thus requiring considerable time.

A variety of filters are also known, which may be applied to one or more colors in an image. Conventionally, such filters act in such a way that they modify colors as a function of intrinsic parameters of the colors themselves. Such filters thus make it possible to generate effects either by selecting an environment or a style imposed by a user, or as a function of the original parameters of the colors to be processed.

The process of generating or changing object colors thus does not allow object features or parameters to which the color is applied, nor the environment in which the objects are displayed, to be taken into account. Thus, to generate realistic effects, a user must proceed manually to determine the target points or areas, parameters to be changed, and the amount of change in the chosen parameters. If one or more objects of one or more scenes are to be processed, the required operations may involve considerable implementation time.

For example, to color an area of a wooden material in order to provide it with a realistic wood appearance, a user must perform the parameter adjustments in a careful and accurate way. Since the coloring tools do not take material properties, or interactions between the objects and the environment, into account, a user who wishes to produce a visual effect based on a reaction or a behavior of a material must first design or imagine the effect desired in a realistic way, and then perform colorimetric modifications based on the parameters of the involved colors. Thus, if a color is applied to an object, its coloring impact will be the same in all areas of this object. For example, if the object has a metal portion, a wooden portion and a plastic area, the applied color produces the same effect on all of these areas, whereas on a real object, the effects produced on each of the materials would show differences, or would even be very different according to the circumstances.

Document FR2681967 discloses a method for changing the colors of an image displayed on a display based on the determination of colorimetric values. The method comprises selecting at least one color representative of at least one pixel in the image comprised of a plurality of pixels, determining colorimetric values of said at least one color, selecting a second color and determining colorimetric values of the second color, and modifying the colorimetric values of a plurality of pixels of the image so that, for any given pixel of said plurality having colorimetric values which correspond to the colorimetric values of said at least one color, the colorimetric values of the given pixel are modified to correspond to the colorimetric values of the second color. The applied color is the same whatever the object's nature (plastic, wood, etc.) and does not take textures into account, but only changes in color of a user selected area.

Document EP0884694 discloses a method for adjusting colors in digital images, in particular "red eye" correction on photographs. The pixel color data is adjusted by identifying pixels in a digital image whose original color data correspond to the predetermined color. However, the applied color is automatic and is only based on colorimetric data, in particular colors of the iris.

Document WO2008066880 discloses a method for obtaining an original set of two or more original colors associated with a piece of art. In order to do so, an input set of one or more user selected colors is received. For each original color, a mapping of the original color onto the derived colors is performed. The plurality of derived colors are obtained based on one or more user selected colors.

Document WO2012154258 discloses a 3D colorimetric coloring tool. Each pixel in the image comprises a set of pixel values in a 3D color space. Although it allows a wide range of colors to be used, the applied color does not change depending on the material to which it is applied.

The document "flow and changes in appearance", Dorsey J and al, computer graphics proceedings 1996 (siggraph), Aug. 4-9, 1996; New York, N.Y.: ACM, pages 411-420, discloses a phenomenological model based on particle systems and equations for modelling the absorption of water by the surface and sedimentation of deposits. The document describes a model with examples of flows over complex geometries. In particular, this document focuses on the explanation and parameterization of phenomena which involve water absorption by surfaces and sedimentation of deposits.

Also, application US2010045669 describes a system and method for simulating and visualizing a flow of fluid interacting with an object. An embodiment of the invention disclosed in this document provides for a simulation of the fall of a liquid along a 2D plane and generates a first and a second depth buffer for top and bottom surfaces of the object. The values of the first and second simulated textures correspond to the object's upper and lower surfaces. A mesh of the fluid is rendered along a 2D plane based on the simulation textures.

Application US20100156920 relates to an apparatus for time-coherence texture synthesis, including a texture preprocessor for receiving, as input information, a 2D texture image and a 3D triangular mesh. The 2D image is preprocessed in a form suitable for rapid searching. A vector field generator is provided for defining a vector field on a 3D surface of the 3D triangular mesh. A color search unit is provided for finding the respective colors of the edges of the triangle based on a previous phase. A texture synthesizer is provided for determining the texture coordinates of the triangle. The texture preprocessor further receives information regarding the size of a texture to be synthetized and an initial vector field orientation.

According to another aspect, the conventional process for generating or modifying object colors does not allow modifications to be performed on the object's shape in a given application in reaction to the physical, chemical, or mechanical parameters of the application itself, and on the inks applied. Finally, conventional processes using the relief-based geometries do not retain the data from the previous steps once the relief features have been modified. Thus, to go back to an previous geometry, it is necessary to manually reconstruct the corresponding architectural elements, which often requires significant implementation time. In case of a complex geometry, it may sometimes be difficult to recover certain previous parameters.

Thus, there is a need to overcome these various drawbacks.

SUMMARY OF THE INVENTION

An object of the invention is to provide a system and method for improving the efficiency and productivity of authoring tools.

Another object is to provide a graphical system and method for enhancing the graphical flexibility and capabilities when creating colors or renderings.

Another object of the invention is to provide a graphical system and method for increasing the realism of the represented elements.

Yet another object of the invention is to provide a system and a method for improving interactivity between the rendering of a represented object and its environment.

Yet another object of the invention is to provide a system and a method for creating a context-sensitive editing mode with environmental parameters taken into account.

Yet another object of the invention is to provide a system and method for performing modifications in the target object's shape based on physical, mechanical, chemical or intrinsic parameters.

Yet another object of the invention is to provide a system and method for going back to phases of geometric modifications of the target object.

For that purpose, the invention provides various technical means. For example, the invention first provides a system for generating procedural textures on an object from physical ink data and physical applicator data, comprising:

access to physical ink data, comprising a plurality of parameters among the following: color, viscosity, temperature, drying time, chemical composition, transparency;
access to physical applicator data, comprising a plurality of parameters among the following: width, depth, thickness, profile, roughness, porosity, applicator flexibility, application force, pressure, application temperature;
access to target object data, including initial mesh data of the target objects and initial relief data of the target objects;
access to mixing rules and functions data;
access to physical data of initial textures T;
a microprocessor and control instructions;
a pre-projection virtual rendering generation module, provided for combining the physical ink data with the physical applicator data;
a pre-projection virtual rendering (PPVR) transformation module, provided for adapting this rendering's data to a given rendering projection mode;
a tessellation module for tessellating the target object data in order to transform relief data of the target objects into a mesh;
an integrator module for integrating the physical parameters, provided for generating a new set of textures T+1 for said one or more objects taking into account the object data, data from the set of textures T, tessellation module data and transformed pre-projection virtual rendering data.

With this system architecture, the resulting textures include all geometric and colorimetric details for realistic and accurate rendering of the applied parameters, using highly-reduced memory space due to the use of procedural parameters.

Advantageously, the system comprises a module for rendering textures from the previously obtained procedural parameters.

Also, advantageously, the system includes a time-based backup module provided for retaining the data needed to again generate a set of textures of an object for which one or more parameters are modified or to return to a previous step of a process, in a state in which the parametric architecture was in that previous step.

Since the modified procedural data includes parameters relating to the geometry of the object transformed as a function of time, it is possible to go back to a previous state. Such a time-based mode is provided for easily and rapidly carrying out tests or comparisons between various parametric architectures, without having to change all parameters of a process, or returning to a previous step, without having to parameterize all the data again.

Also, advantageously, the mixing rules and functions data include parameters related to the deformation of objects.

Parameters related to the deformation of objects are advantageously effective on the mesh and/or relief data.

According to an alternative embodiment, the system comprises an integrator module, provided for using combination rules and/or functions to define and/or adjust the modes of integration of the various physical parameters relative to one another.

Alternatively, the integrator module includes a rule selection sub-module and a rule implementation sub-module for, on the one hand, selecting at least one applicable rule and/or function, and on the other hand, determining the mode of application of the rule in order to generate the resulting data for textures T+1.

The system thereby offers great flexibility, for example by providing rules according to which a given parameter, such as, for example, corrosion, produces an effect on a metallic material, and no effect on a PVC material.

Advantageously, the system comprises access to any application rate and/or environment data.

The invention also provides a method for generating procedural textures on an object from physical ink data and physical applicator data, comprising the steps in which: one or more data sources provide access to:

physical applicator data, comprising a plurality of parameters among the following: width, depth, thickness, profile, roughness, porosity, applicator flexibility, application force, pressure, application temperature;

target object data, comprising initial mesh data of the target objects and initial relief data of the target objects;
mixing rules and functions data;
physical data of initial textures T;
a pre-projection virtual rendering generation module combines the physical ink data with the physical applicator data;
a pre-projection virtual rendering transformation module receives the previously obtained pre-projection virtual rendering data, and adapts this data to a given rendering projection mode;
a tessellation module performs a transformation of at least part of the (initial) relief data into (final) mesh data;
an integrator module for integrating the physical parameters receives object data, data from the set of textures T, transformed pre-projection virtual rendering data, relief and mesh data of the object, and any corresponding application rate and environment data, and generates a new set of textures T+1 for said one or more objects, taking this data into account.

In an advantageous embodiment, the integrator module receives integration rules and/or functions to define and/or adjust the modes of action of the various physical parameters relative to one another.

According to yet another embodiment, a rule selection sub-module selects at least one applicable rule and/or function and a rule implementation sub-module to determine the mode of application of the rule in order to generate the resulting data for textures T+1.

Also, advantageously, a time-based backup module retains the data needed to again generate a set of textures (T+1) of an object for which one or more parameters are modified or to return to a previous step of a process, in the state in which the parametric architecture was in this previous step.

DESCRIPTION OF THE DRAWINGS

Other features and advantages of the invention will appear from the following description, which is provided by way of non-limiting example, with reference to the appended drawings, in which.

DETAILED DESCRIPTION OF THE INVENTION

In the following description, substantially identical or similar items will be referred to by identical reference numerals.

By physical "ink" or "paint", is meant a solid, liquid, or gaseous element or a mixture of these phases, which, when applied to an object, causes a physical change at least in the surface of said object, in particular textures on this object, such that at least one of its physical parameters or features, in particular a visible feature, is modified.

By "physical parameter", is meant any physical and/or chemical element, property, or feature, liable to be measured or detected observed or quantified, characterizing an object, ink, environment, applicator, etc.

By "parametric architecture", is meant the set of parameters for defining the physical, chemical features (an object's constituents, properties, visual aspect, texture, ink, etc.) and behavioral features of an element (ink, texture, object, etc.).

By "physical applicator", is meant an element, in particular a virtual element whether visible or not in a scene, allowing ink or paint to be applied to a physical object, such as a brush, roller, pencil, gun applicator, spray nozzle or vaporizer, plate, tool, etc.

By "application rate", is meant the overall opacity of the brush/applicator stroke applied by a user, which is user adjustable and uncorrelated to other parameters, such as ink. For example, when a user starts the painting process on an object which is not or is slightly covered, the "application rate" can be set to a large value, so that each brush/applicator stroke strongly impacts the object's texture. When the user reaches a phase of refinement and small alterations, he/she can adjust this rate to a lower value, so as not to entirely change already painted locations, but to gently adjust some details.

Depending on the circumstances and embodiments, the application rate can be expressed in several ways. For example, the application rate $\tau$ can be expressed as a value ranging between 0 and 1. If there are two inputs A (the existing texture) and B (the texture to be applied), the output Y is equal to "$A*(1-T)\pm B*T$". If $\tau=0$, nothing is applied and the new texture is equal to the existing texture. If $\tau=1$, the new texture is equal to the texture to be applied (i.e. points covered by the brushstroke) and the previous texture is entirely covered in the affected areas.

By mixing "rule" or "function" is meant a description of the process that determines how a material (and optionally one or more 'inks' already applied to the material at a given location) and an ink applied to this material will react. By way of illustration, some examples of rules are as follows:

a liquid applied to bare wood is absorbed by the wood. Alternatively, its effect is to darken the color of the wood;

a liquid applied to a varnish or plastic is not absorbed at all and produces a "drop" effect on the surface of the material;

heat applied to a painted material has the effect of flaking the paint and then burning it, depending on the temperature set by the user, and possibly calcining the material to which the paint is applied if it is combustible;

applying an acid or sandblasting to glossy plastic will gradually roughen it, reducing its brightness, and make it increasingly rough. With the method and system described in the following, the various steps of an evolutionary process can be determined and presented.

By "procedural texture", is meant a texture defined algorithmically and/or mathematically and displayed by a rendering engine which allows the mathematical data to be transformed into a conventional image format such as bitmap.

Figure 1:
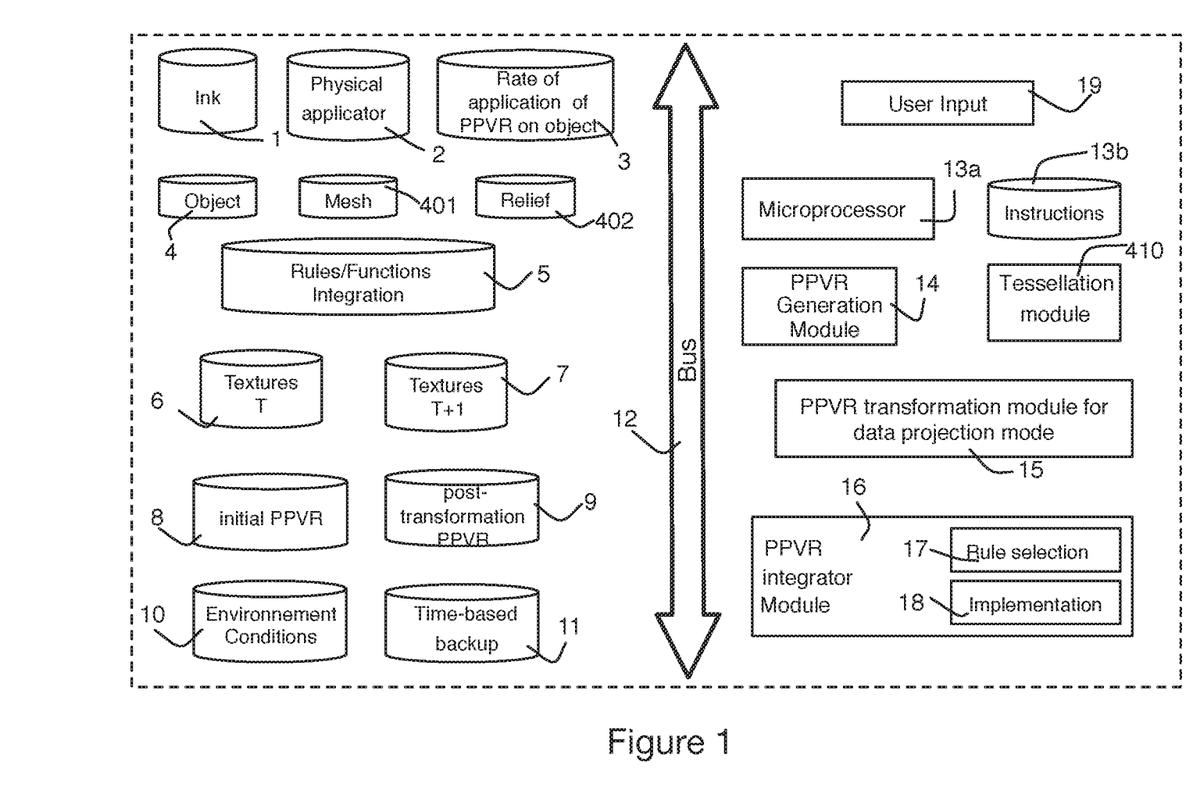
FIG. 1 is a schematic representation of an exemplary system for generating textures according to the invention.

FIG. 1 illustrates an exemplary system for generating procedural textures according to the invention. This system comprises at least one microprocessor 13a, adapted for implementing instructions contained in an instruction memory 13b. A plurality of modules are advantageously provided by the instructions implemented by the microprocessor.

An ink data item 1 stores the physical parameter data of the one or more inks available. For example, this data includes color, viscosity, temperature, drying time, chemical composition, transparency rate, etc.

A physical applicator data item 2 stores data that characterize physical applicators. This data may include a plurality of parameters such as width, depth or thickness, profile, roughness, porosity, applicator flexibility, application force, pressure, application temperature, etc. Typically, this will be any parameter that may influence the application characteristics of an ink onto a destination object. An index can be assigned to each of the parameters in order to weight their significance levels.

An application rate data item 3 stores the data of physical parameters related to the application rate for off-object rendering.

A target object data item 4, which includes initial target object mesh data 401 and initial target object relief data 402, stores the target object data liable to be modified by the applied physical parameters. This data comprises, for example, the physical characteristics of the target objects such as shapes, dimensions, weight, absorption coefficient, porosity, chemical composition and various characteristics relating to the surface and textures of objects.

A data item 6 of textures T of the object stores data for the initial textures of the target objects onto which one or more inks may be applied. Any data for newly obtained textures T+1 is contained in a memory element 7. This data includes, for example, physical characteristics such as ink composition, color, thickness, brightness, relief, light reflection characteristics, etc.

An integration data item 5 stores rules and/or functions data to be applied by integrator 16 to generate the new set of textures T+1. These rules and/or functions allow one or more processes, which may influence the result, to be taken into account, such as color mixing (for example, a rule can allow calculation of the averages of the applied colors), chemical interactions between components, capillary diffusion, combustion or any thermodynamic process, drop effect, modification or alteration of the object's surface (such as corrosion or oxidation, mold, flaking, etc.).

Furthermore, for adequate management of the geometric characteristics, the mixing rules and functions data 5 includes parameters relating to object deformation. These parameters relating to object deformation are advantageously effective on the mesh and/or relief data of the target objects.

A Pre-Projection Virtual Rendering (PPVR) data item 8 stores data for the rendering obtained after combining the ink data and the physical applicator data. Any post-transformation rendering data obtained after the expected projection mode has been taken into account is contained in a memory element 9. This data includes, for example, physical characteristics such as ink composition, color, thickness, brightness, relief, light reflection characteristics, etc.

An optional item of parameters related to environmental conditions 10 includes parameters that may affect several elements in the scene, such as temperature, pressure, humidity, physical force (magnetic, gravitational or the like) data, etc.

An optional time-based backup module 11 allows data related to a given time scale to be saved, in particular, user inputs such as trajectory, pressure, direction, opacity data, etc. For example, this module can rerun an animated simulation after modifying one or more parameters, by performing only the operations that are required by the modified data. Thus, it is possible to simply and rapidly perform consecutive simulations based on a previous one, or to recover a previously performed simulation.

The memory elements described above and/or the various modules can be combined into one or more elements and one or more modules without significantly affecting the operation of the system.

Through a user input 19, data can be received from an external source, such as a user who provides a course of application of the physical parameters. This input can be used to receive several types of parameters such as pressure, direction, or opacity data, etc., so as to appropriately define, quantify and delimit the applied parametric elements.

A pre-projection virtual rendering (PPVR) generation module 14 is provided for generating a pre-projection virtual rendering onto the target object with physical pre-projection virtual rendering (PPVR) data being adapted for projection onto a target object independently from the projection mode. A pre-projection virtual rendering (PPVR) is obtained based on the physical ink and physical applicator data.

A pre-projection virtual rendering (PPVR) transformation module 15 is provided for setting the PPVR data to a given rendering projection mode (vector/unidirectional or normal/tangential).

A tessellation module 410 performs a transformation on at least one portion of the relief (initial) data into mesh (final) data.

A physical parameter integrating module 16, provided for generating a new set of textures T+1 for said object, with object data, data for the set of textures T, transformed PPVR data, relief and mesh data of the object and any corresponding application rate and environment data.

Integrator module 16 includes a rule selection sub-module 17 and a rule implementation sub-module 18 for, on the one hand, selecting at least one applicable rule and/or function, and on the other hand, determining the mode of application of the rule to generate the resulting data for textures T+1.

A bus 12 enables data transfers among the various modules and memory elements described below.

Figure 2:
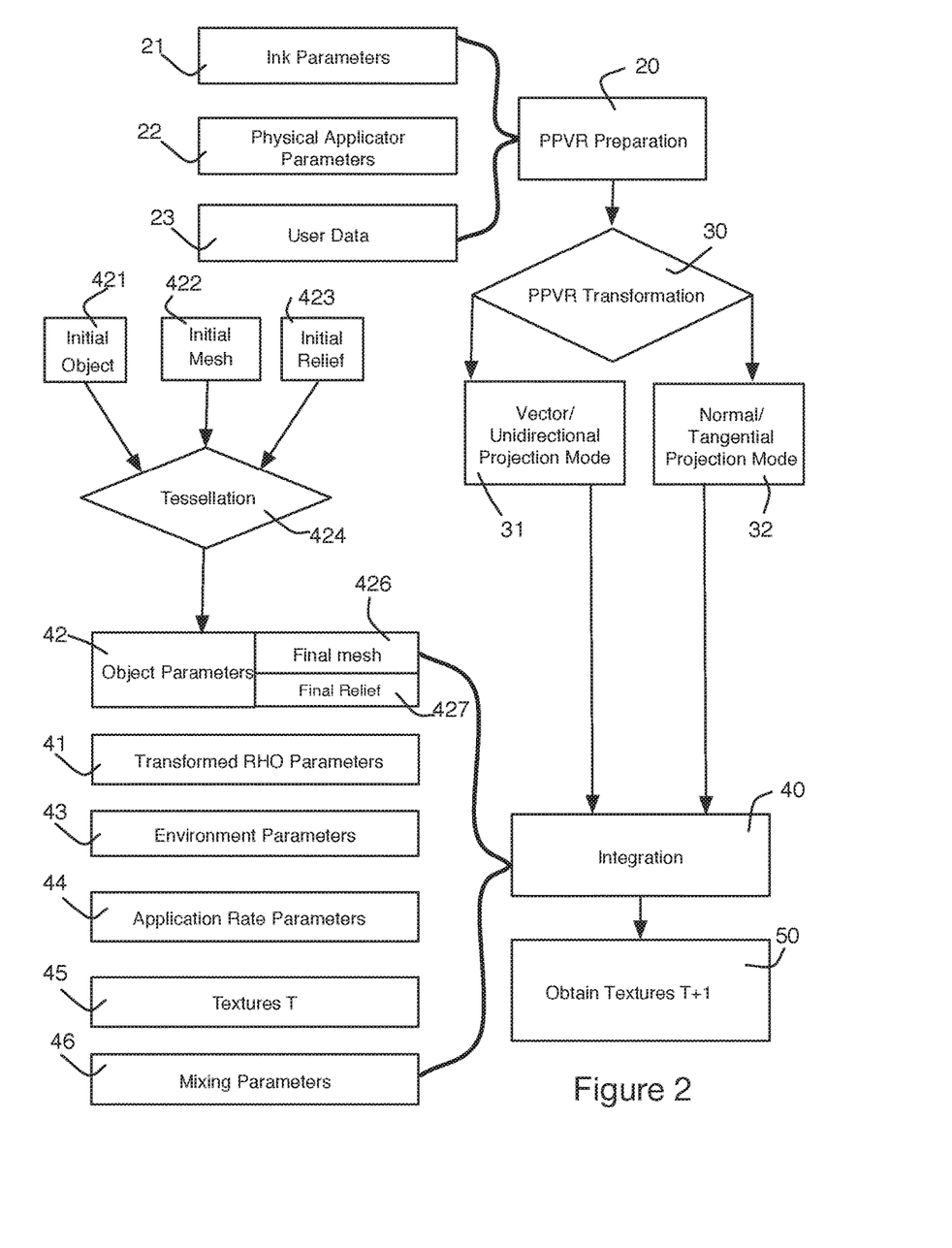
FIG. 2 is a block diagram showing the main steps of the texture generation method according to the invention.

FIG. 2 shows a flowchart of the main steps of the procedural texture generation method according to the invention. In step 20, the system is initialized and the pre-projection virtual rendering (PPVR) generation module 14 receives data items 21 and 22 related to the ink parameters and physical applicator parameters, and user data 23 related to the course of application of the physical parameters. An off-object rendering is generated by the pre-projection virtual rendering (PPVR) generation module 14.

In step 30, the pre-projection virtual rendering (PPVR) transformation module 15 performs a transformation of the rendering into a format required by the applicable projection mode. Depending on this mode, step 31 will be involved in case it is a vector-based or unidirectional projection mode. Step 32 will be carried out in case it is a normal or tangential projection mode.

A tessellation step 424 transforms at least part of the relief data into mesh data.

Regardless of the type of projection, the next step 40 integrates the pre-projection virtual rendering (PPVR) by means of the integrator module. This step involves selecting applicable rules and/or functions and implementing the integration based on these applicable rules and/or functions. This phase involves integrating physical parameters such as the object's parameters, including the final mesh and final relief data, application rate, texture parameters T and environment parameters to generate and/or adapt a new set of textures T+1 for the one or more objects affected by events occurring in the scene. Finally, in step 50, the data for texture T+1 is obtained.

MODIFICATIONS AND OTHER EMBODIMENTS

The system and method of the present invention have been disclosed above in a working environment suitable for an editing tool intended for a user wishing to create or modify the rendering of one or more objects.

Alternatively, the system and method of the present invention can be used in a standalone mode, for generating object renditions based on physical parameters that are pre-established or may be computed by the system itself, for example based on intermediate results. Such embodiments are advantageously employed in movies or video games, especially games or movies in which the renditions or textures are generated by a procedural texture generation engine. Document WO2012014057, which is incorporated herein by reference, discloses an example of such a rendering system and method.

The system and method of the invention can generate and/or modify renditions of objects based on technical (physical, chemical, thermodynamic, etc.) factors inherent to the objects themselves as well the scene's environment.

For example, to create a corrosive effect on an object, a user may use an ink or paint and objects whose parameters are related to corrosion. Among these physical parameters (other than color data), object behaviors that depend on the applied inks or paints, that is, interactions between the various physical elements, may for example imply that materials such as plastics do not react to corrosive effects, corroded areas develop on steel, copper becomes oxidized, etc.

In some embodiments, certain parameters can be assigned either to physical inks or paints, or to objects or the environment, or else to mixing rules or functions. The parametric distribution or architecture can also vary in order to produce comparable renditions.

In another exemplary use of the method and system according to the invention, the physical paint or ink to be applied onto objects only comprises non-colorimetric parameters, such as thermal energy or heat data, pressure data, etc. In one example where the physical applicator applies heat, the applicator can be a soldering iron for performing pyrography operations on a wooden plate. If a metal edge frames the wood area to be burned, parameters and rules allow physical phenomena to be managed so that the application of the soldering iron to the metal does not generate any "burned" effect. The data for the course of application is used to define the design or pattern produced by the burning operation. Depending on the case, the course data can be provided by a user who simulates a movement of the soldering iron, or of an application card used as input.

In another example, a paint remover is applied to a table-top by means of a spray gun. The initial painted wood textures are substituted to textures showing the same wood, but in its natural state, without paint. Depending on the course of application, one or more areas retaining leftover paint may still be present on the object.

Table 1 below illustrates examples of parameters and rules used to implement the aforementioned examples.

TABLE 1

| Example of physical parameters | | | | | |
|---|---|---|---|---|---|
| Ink/Paint | Applicator | Object | Mixing rule/function | Initial texture | Final texture |
| Corrosive liquid | Brush or roll | Metallic body | Mode and intensity of metal corrosion | New metal | Rusty metal |
| Heat | Soldering gun | Wood plate | Effect and intensity of heat | Light-colored wood | Burned wood |
| Liquid paint remover | Spray (spray gun) | Table-top | Effect and intensity of chemical attack | Painted wood | Natural wood |

TABLE 1-continued

The time-based backup can advantageously be used to go back into a given process in order to select one of multiple previous states. It can also help to rebuild a process by modifying only one or a few parameters, without having to change other parameters, thus avoiding having to reconfigure the entire data. This allows, for example, results that can be achieved by modifying only certain parameters to be quickly and easily compared. For example, it is possible to change a characteristic of an ink (for example, color) for one or more brushstrokes previously applied during the process. In another example, ink viscosity is changed to reduce its impact on a prior layer.

The figures and their above descriptions illustrate rather than limit the invention. The reference numerals in the claims have no limiting character. The words "include" and "comprise" do not exclude the presence of elements other than those listed in the claims. The word "a" preceding an element does not exclude the presence of a plurality of such elements. In addition, the above described system and method advantageously operate in a multi-channel mode, that is, by processing several textures (diffuse, normal, etc.) at each step. Thus, the terms "texture T (or T+1)" and "textures T (or T+1)" refer to one or more textures depending on the particular cases or embodiments.

The invention claimed is:

1. A system for generating procedural textures on an object from physical ink data and physical applicator data, comprising:
   i) access to physical ink data, comprising a plurality of parameters among the following: color, viscosity, temperature, drying time, chemical composition, and transparency;
   ii) access to physical applicator data, comprising a plurality of parameters among the following: width, depth, thickness, profile, roughness, porosity, applicator flexibility, application force, pressure, and application temperature;
   iii) access to target object data including initial mesh data of the target objects and initial relief data of the target objects;
   iv) access to mixing rules and functions data providing a description of a process determining how a material and an ink applied to the material reacts;
   v) access to physical data of initial textures T;
   vi) a microprocessor and control instructions;
   vii) a pre-projection virtual rendering generation module, provided for combining the physical ink data with the physical applicator data independently from a projection mode;
   viii) a pre-projection virtual rendering (PPVR) transformation module, provided for adapting the data of step vii to the projection mode, unidirectional or tangential;

ix) a tessellation module for tessellating the target object data in order to transform relief data of the target objects into a mesh; and x) an integrator module, provided for generating a new set of textures T+1 for said one or more objects taking into account object data, data from the set of textures T, data from the tessellation module and transformed pre-projection virtual rendering data.

2. The system for generating textures according to claim 1, further comprising a module for rendering textures from previously obtained parameters.

3. The system for generating textures according to claim 1, further comprising a time-based backup module provided for retaining the data needed to again generate a set of textures of an object for which one or more parameters are modified or to return to a previous step of a process, in the state in which the parametric architecture was in this previous step.

4. The system for generating textures according to claim 1, wherein the mixing rules and functions data include parameters related to the deformation of objects.

5. The system for generating textures according to claim 4, wherein parameters related to the deformation of objects are effective on the mesh and/or relief data.

6. The system for generating textures according to claim 1, further comprising an integrator module, provided for using combination rules and/or functions to define and/or adjust the modes of integration of the various physical parameters relative to one another.

7. The system for generating textures according to claim 1, wherein the integrator module includes a rule selection sub-module and a rule implementation a sub-module for, on the one hand, selecting at least one applicable rule and/or function and on the other hand, determining the mode of application of the rule in order to generate the resulting data for textures T+1.

8. A method for generating procedural textures on an object based on physical ink data and physical applicator data, comprising the steps in which:
   a) one or more data sources provide access to:
      i) physical applicator data, comprising a plurality of parameters among the following: width, depth, thickness, profile, roughness, porosity, applicator flexibility, application force, pressure, and application temperature;
      ii) target object data, comprising initial mesh data of the target objects and initial relief data of the target objects;
      iii) mixing rules and functions data providing a description of a process determining how a material and an ink applied to the material reacts;
      iv) physical data of initial textures T;
   b) a pre-projection virtual rendering generation module combines the physical ink data with the physical applicator data independently from a projection mode;
   c) a pre-projection virtual rendering transformation module receives the previously obtained pre-projection virtual rendering data, and adapts this data to the projection mode, unidirectional or tangential;
   d) a tessellation module performs a transformation of at least part of the relief data into mesh data; and
   e) an integrator module receives object data, data from the set of textures T, transformed pre-projection virtual rendering data, relief and mesh data of the object, and any corresponding application rate and environment data, and generates a new set of textures T+1 for said one or more objects, taking this data into account.

9. The method for generating textures according to claim 8, wherein the integrator module receives integration rules and/or functions to define and/or adjust the modes of action of the various physical parameters relative to one another.

10. The method for generating textures according to claim 8, wherein a rule selection sub-module selects at least one applicable rule and/or function and a rule implementation sub-module to determine the mode of application of the rule in order to generate the resulting data for textures T+1.

11. The method for generating textures according to claim 8, wherein a time-based backup module retains the data needed to again generate a set of textures (T+1) of an object for which one or more parameters are modified or to return to a previous step of a process, in the state in which the parametric architecture was in this previous step.

12. A system, executable by at least one processor connected to a memory, for generating procedural textures on a target object, comprising:
   physical ink data, accessible by the at least one processor from the memory, wherein the physical ink data comprises at least one of color, viscosity, temperature, drying time, chemical composition, and transparency;
   physical applicator data, accessible by the at least one processor from the memory, wherein the physical applicator data comprises at least one of width, depth, thickness, profile, roughness, porosity, applicator flexibility, application force, pressure, and application temperature;
   target object data, accessible by the at least one processor from the memory, wherein the target object data comprises initial mesh data of the target object and initial relief data of the target object;
   mixing rules and functions data, accessible by the at least one processor from the memory, wherein the mixing rules and functions data determine how to modify the target object data using the physical ink data and the physical applicator data;
   physical data, accessible by the at least one processor from the memory, wherein the physical data comprises initial textures T of the target object;
   a pre-projection virtual rendering generation module, executable by the at least one processor, wherein the pre-projection virtual rendering generation module relies on the mixing rules and functions data to combine the physical ink data with the physical applicator data to create combined data independently from a projection mode;
   a pre-projection virtual rendering (PPVR) transformation module, executable by the at least one processor, wherein the pre-projection virtual rendering transformation module adapts the combined data to the projection mode, unidirectionally or tangentially, by generating projection data;
   a tessellation module, executable by the at least one processor, wherein the tessellation module transforms the target object data into modified mesh data; and
   an integrator module, executable by the at least one processor, wherein the integrator module generates modified physical data, comprising a new set of textures T+1 for the target object, taking into account at least one of the target object data, the physical data, the modified mesh data, the combined data, and the projection data.

13. The system for generating textures according to claim 12, further comprising:

a textures rendering module, executable by the at least one processor, for rendering textures on the target object using the modified physical data.

14. The system for generating textures according to claim 12, further comprising:
a time-based backup module, executable by the at least one processor, for retaining the physical data and the modified physical data, thereby subsequently permitting return to the physical data or permitting further modification of the modified physical data.

15. The system for generating textures according to claim 12, wherein the mixing rules and functions data also determine how to modify the target object data using parameters related to a deformation of the target object.

16. The system for generating textures according to claim 15, wherein parameters related to the deformation of target object are applied to the initial mesh data and/or the initial relief data.

17. The system for generating textures according to claim 12, wherein the integrator module combines the mixing rules and functions data when generating the modified physical data.

18. The system for generating textures according to claim 12, wherein the integrator module includes a rule selection sub-module and a rule implementation a sub-module for selecting at least one mixing rule to determine how to apply the at least one mixing rule to generate the modified physical data.

19. A method, executable by at least one processor connected to a memory, for generating procedural textures on a target object via the system according to claim 12, comprising the steps of:
retrieving, by the pre-projection virtual rendering generation module, the mixing rules and functions data;
combining, by the pre-projection virtual rendering generation module, the physical ink data with the physical applicator data to create the combined data;
receiving, by the pre-projection virtual rendering transformation module, the combined data;
adapting the combined data to the projection mode, unidirectionally or tangentially, by generating the projection data;
transforming, by the tessellation module, the target object data into the modified mesh data;
receiving, by the integrator module, the target object data, the physical data, the modified mesh data, the combined data, and the projection data; and
generating, by the integrator module, the modified physical data.

* * * * *